US010936109B2

(12) United States Patent
Li et al.

(10) Patent No.: US 10,936,109 B2
(45) Date of Patent: Mar. 2, 2021

(54) TERMINAL DEVICE AND TERMINAL DEVICE CONTROL METHOD

(71) Applicant: HUAWEI TECHNOLOGIES CO., LTD., Shenzhen (CN)

(72) Inventors: Zijun Li, Shenzhen (CN); Fen Yang, Nanjing (CN); Chen Sheng, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 92 days.

(21) Appl. No.: 16/083,517

(22) PCT Filed: Mar. 31, 2016

(86) PCT No.: PCT/CN2016/077951
§ 371 (c)(1),
(2) Date: Sep. 10, 2018

(87) PCT Pub. No.: WO2017/166149
PCT Pub. Date: Oct. 5, 2017

(65) Prior Publication Data
US 2019/0079656 A1    Mar. 14, 2019

(51) Int. Cl.
*H04L 12/00* (2006.01)
*G06F 3/041* (2006.01)
(Continued)

(52) U.S. Cl.
CPC ........ *G06F 3/0416* (2013.01); *G06F 3/04817* (2013.01); *G06F 9/445* (2013.01);
(Continued)

(58) Field of Classification Search
CPC ........ G06F 3/0416; G06F 9/445; G06F 9/452; H04L 12/282; H04L 29/08; G08C 17/02
(Continued)

(56) References Cited

U.S. PATENT DOCUMENTS 5,035,157 A * 7/1991 Aoki .................. F16H 61/0213
477/128
6,526,132 B2 * 2/2003 Kim ........................ H04M 3/42
379/142.01
(Continued)

FOREIGN PATENT DOCUMENTS

CN        1866793 A      11/2006
CN      102650943 A       8/2012
(Continued)

*Primary Examiner* — Frantz Coby
(74) *Attorney, Agent, or Firm* — Kilpatrick Townsend & Stockton LLP

(57) ABSTRACT

A terminal device sends a directional signal in a direction in which a to-be-controlled device is located, the to-be-controlled device establishes a transmission channel between the to-be-controlled device and the terminal device according to the directional signal, the to-be-controlled device returns a response signal to the terminal device after receiving the directional signal, and the terminal device controls, according to the response signal, an application program corresponding to the to-be-controlled device to start. In this way, a process in which the user uses the terminal device to control the to-be-controlled device, and searches for an application program of the to-be-controlled device is simple, and many application programs do not need to be searched one by one for the required application program.

17 Claims, 5 Drawing Sheets

(51) Int. Cl.
*H04L 29/08* (2006.01)
*G06F 9/445* (2018.01)
*G06F 3/0481* (2013.01)
*H04L 12/28* (2006.01)
*G08C 17/02* (2006.01)
*G06F 9/451* (2018.01)

(52) U.S. Cl.
CPC ............ *H04L 12/282* (2013.01); *H04L 29/08* (2013.01); *G06F 9/452* (2018.02); *G08C 17/02* (2013.01)

(58) Field of Classification Search
USPC ........................................ 709/227, 228, 229
See application file for complete search history.

(56) References Cited

U.S. PATENT DOCUMENTS

| | | | | |
|---|---|---|---|---|
| 6,914,597 B2* | 7/2005 | Myers | ................... | G09G 5/006 326/36 |
| 6,930,513 B2* | 8/2005 | Kim | ................... | H04L 5/1423 326/59 |
| 7,202,727 B2* | 4/2007 | Lee | ................ | H03K 19/017536 326/63 |
| 7,969,300 B2* | 6/2011 | Coronel | ................... | H04Q 9/00 340/539.1 |
| 8,139,956 B2* | 3/2012 | Miller | ................... | H04B 10/66 398/197 |
| 8,171,290 B1* | 5/2012 | Sikora | ................... | H04L 9/3271 713/168 |
| 8,909,211 B2* | 12/2014 | Huq | ................... | H04L 67/04 455/419 |
| 2003/0162551 A1* | 8/2003 | Atarashi | ................ | H04W 16/28 370/491 |
| 2006/0270458 A1* | 11/2006 | Watanabe | ................ | G08C 17/02 455/562.1 |
| 2009/0274047 A1* | 11/2009 | Kruys | ................... | H04L 47/33 370/236 |
| 2010/0099396 A1 | 4/2010 | Huq et al. | | |
| 2011/0211584 A1 | 9/2011 | Mahmoud | | |
| 2012/0221840 A1 | 8/2012 | Sun | | |
| 2013/0039217 A1* | 2/2013 | Cordeiro | ................... | H04B 7/06 370/254 |

FOREIGN PATENT DOCUMENTS

| | | |
|---|---|---|
| CN | 103500495 A | 1/2014 |
| CN | 103686264 A | 3/2014 |
| CN | 103777845 A | 5/2014 |
| JP | 2004320209 A | 11/2004 |

\* cited by examiner

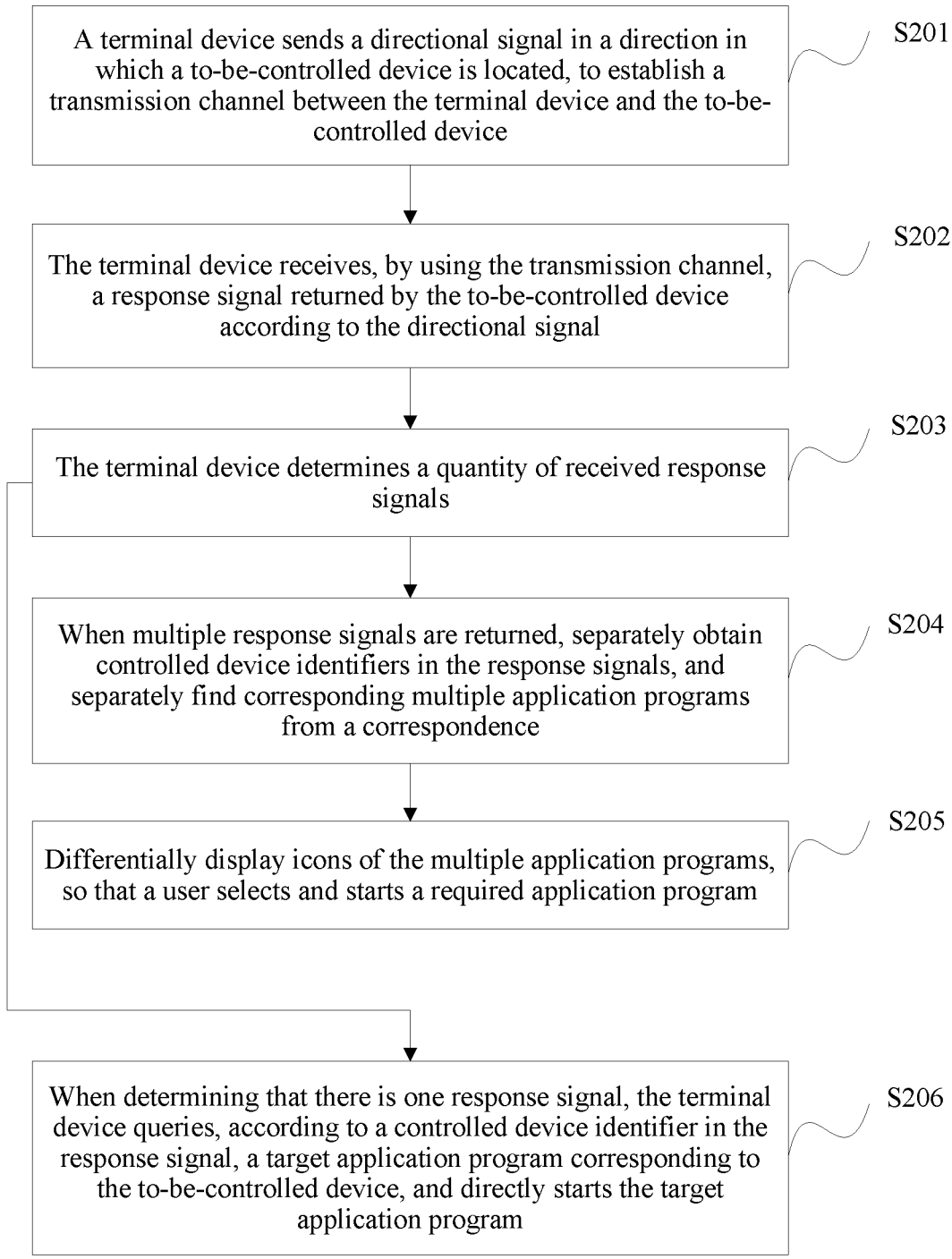
FIG. 2-a

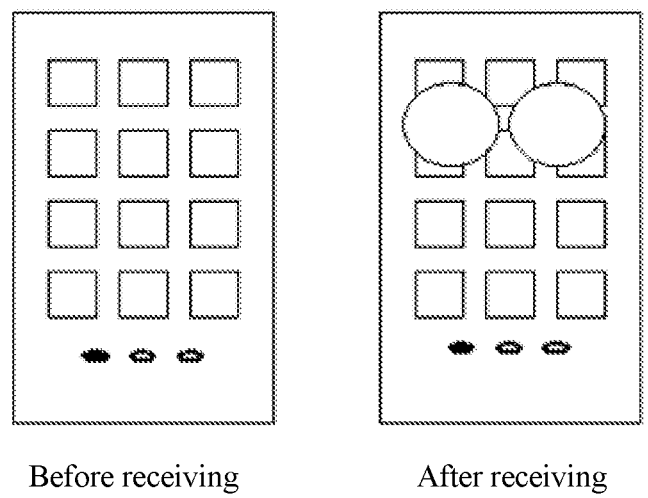
Before receiving          After receiving
FIG. 2-b
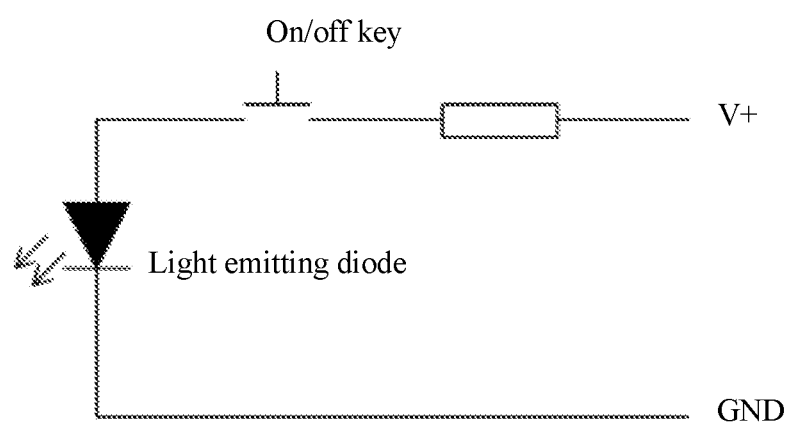
FIG. 2-c

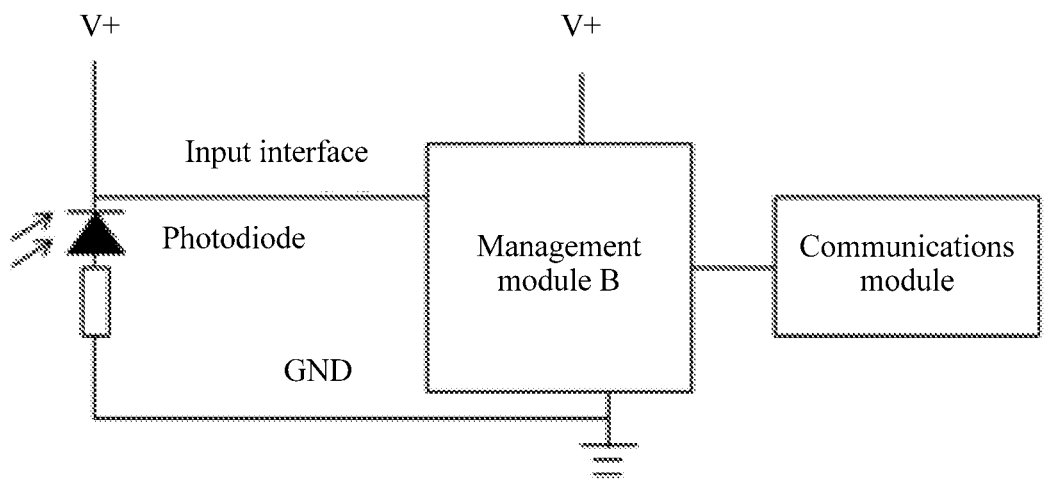
FIG. 2-d
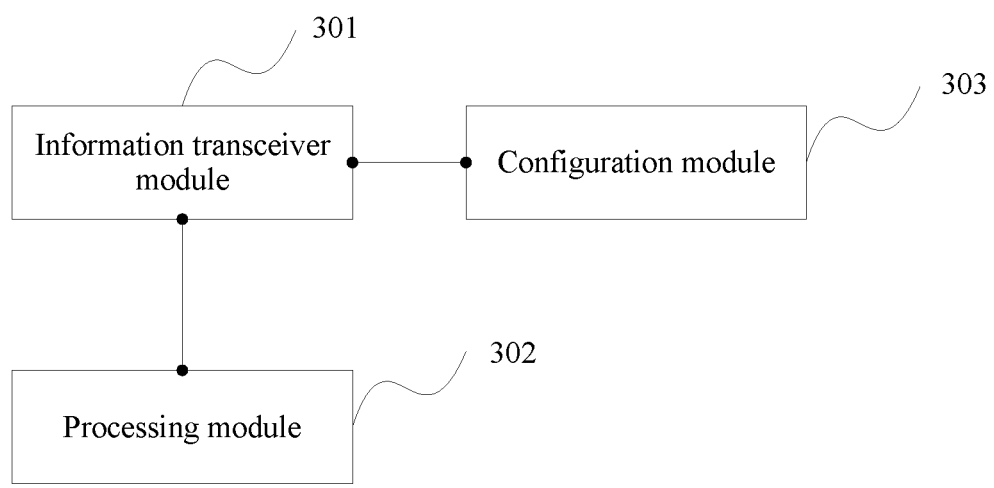
FIG. 3

TERMINAL DEVICE AND TERMINAL DEVICE CONTROL METHOD

CROSS-REFERENCE TO RELATED APPLICATIONS

This application is a national stage of International Application No. PCT/CN2016/077951, filed on Mar. 31, 2016, which is hereby incorporated by reference in its entirety.

TECHNICAL FIELD

The present invention relates to the field of intelligent control, and in particular, to a terminal device and a terminal device control method.

BACKGROUND

Currently, when a mobile phone is used to control many electronic devices to work, for example, control a home appliance, a watch, and a pedometer, an application program generally needs to be installed on the mobile phone, and the electronic devices may be controlled after the application program is executed.

Development of Internet of Things is accompanied with an increase in types of electronic devices that need to be controlled and the electronic devices. Various application programs need to correspondingly cooperate with electronic devices, and therefore, increasing application programs are installed on the mobile phone. A user can manually find, from many application programs, an application program that can match a specific electronic device.

Generally, one electronic device is corresponding to one application program. Each time an electronic device needs to be controlled, an icon corresponding to the electronic device needs to be found from many icons on the mobile phone, and then, the icon is tapped to execute an application program. Therefore, if a user expects to find an icon from many icons, multiple operations such as unlocking a screen, switching a desktop, and searching for an icon are required. The process is relatively complex, and therefore user experience is compromised.

SUMMARY

In view of this, the present invention provides a terminal device and a terminal device control method.

According to a first aspect, an embodiment of the present invention provides a terminal device control method, where the method includes:

A terminal device sends a directional signal in a direction in which a to-be-controlled device is located, to establish a transmission channel between the terminal device and the to-be-controlled device. The terminal device in this embodiment of the present invention may be a mobile terminal, and may be specifically a portable and movable electronic device such as a smartphone, a personal digital assistant, a wearable device, an Internet of Things terminal, or a multi-purpose remote control in a family. The terminal device includes a signal transmitter circuit that may transmit a directional signal outward. The directional signal may be a visible light signal or an infrared signal. Herein, the directional signal is transmitted, so that a device that a user expects to control can receive the directional signal. The terminal device transmits the directional signal in the direction in which the to-be-controlled device is located, so that the to-be-controlled device in the direction can receive the directional signal, and another device not in the direction cannot receive the directional signal. When receiving the directional signal, the to-be-controlled device may establish the transmission channel between the terminal device and the to-be-controlled device. The transmission channel may be a directional signal or a non-directional signal such as a Bluetooth channel or an infrared channel, provided that the transmission channel between the terminal device and the to-be-controlled device can be established.

The terminal device receives, by using the transmission channel, a response signal returned by the to-be-controlled device according to the directional signal. After receiving the directional signal, the to-be-controlled device may feed back the response signal to the terminal device according to the directional signal. The response signal may be a non-directional signal, so that the terminal device conveniently receives the response signal. The response signal may be a Bluetooth signal. It should be noted that, before the to-be-controlled device feeds back the response signal, a security authentication phase may be set, that is, it is determined whether the received directional signal is authorized. No response may be made to an unauthorized directional signal. Certainly, the to-be-controlled device may not perform security authentication. In this case, the to-be-controlled device returns the response signal to the terminal device according to the transmission channel after receiving the directional signal. A controlled device identifier of the to-be-controlled device may be added to the response signal, so that the terminal device can determine a source of the response signal. The controlled device identifier may include an international mobile equipment identity of the device, a device model, a device name, or the like. For example, a television identifier is added to a response signal that is from a television, and an air conditioner identifier may be added to a response signal that is from an air conditioner.

The terminal device starts, according to the response signal, a target application program corresponding to the to-be-controlled device. The target application program is installed on the terminal device. Therefore, the user may not need to additionally search the terminal device for the required application program of the to-be-controlled device, but only need to send the directional signal in the direction in which the to-be-controlled device is located. The terminal device may determine the application program of the to-be-controlled device according to the response signal that is fed back, and may start the application program, so that the user is prevented from searching the terminal device for an icon of the application program, operation steps are reduced, and control operation efficiency is improved.

For ease of determining the application program of the to-be-controlled device, the terminal device configures a correspondence between a controlled device identifier and an application program. The terminal device obtains the controlled device identifier of the controlled device from the obtained response signal, and queries, in the correspondence, the target application program corresponding to the controlled device identifier, and then, may start the target application program. Therefore, an operation process is efficient and convenient, and unnecessary steps are reduced.

In a possible design, after the terminal device receives, by using the transmission channel, the response signal returned by the to-be-controlled device according to the directional signal, the terminal device determines a quantity of received response signals; and when multiple response signals are returned, separately obtains controlled device identifiers in the response signals, separately finds corresponding multiple application programs from the correspondence, and differentially displays icons of the multiple application programs. Therefore, the user only needs to trigger an icon of the required application program on a screen of the terminal device, and is prevented from searching for the icon of the application program.

In a possible design, to improve terminal device control security, the terminal device sends, in the direction in which the to-be-controlled device is located, the directional signal that carries an identity of the terminal device, so that identity authentication can be performed. The identity authentication includes that the to-be-controlled device determines, according to the identity of the terminal device, whether the terminal device is authorized. The to-be-controlled device responds only when the terminal device is authorized, so that control process security can be improved, and immunity to interference can be improved.

In a possible design, the icons of the found application programs may be differentially displayed in the following manner: displaying the icons of the found multiple application programs in a highlighted manner; or putting the icons of the found multiple application programs into a to-be-selected area set, and displaying the to-be-selected area set on a display image in a floating manner. Specifically, display positions, display sizes, display contours, display colors, display luminance, or display floating of the icons of the found application programs may be adjusted, so that the user can easily find the icons.

In a possible design, the directional signal includes an infrared signal or a visible light signal. To improve security, authentication information may be added to the directional signal, so that the to-be-controlled device determines permission of the terminal device according to the authentication information.

In a possible design, when the to-be-controlled device returns the response signal to the terminal device, a non-directional signal such as a Bluetooth signal may be used. Therefore, the transmission channel is a Bluetooth transmission channel or an infrared transmission channel.

According to a second aspect, an embodiment of the present invention provides a terminal device control apparatus. The terminal device control apparatus has a function of implementing the foregoing terminal device control method in the first aspect. The function may be implemented by using hardware, or may be implemented by hardware by executing corresponding software. The hardware or the software includes one or more modules corresponding to the function.

In a possible design, a structure of the terminal device control apparatus includes a processor and a memory. The memory is configured to store a program that supports the terminal device control apparatus in performing the foregoing method, and the processor is configured to execute the program stored in the memory. The terminal device control apparatus may further include a communications interface used by the terminal device control apparatus to communicate with another device or a communications network.

According to a third aspect, an embodiment of the present invention provides a terminal device, including a processor and a radio frequency circuit.

The radio frequency circuit sends a directional signal in a direction in which a to-be-controlled device is located, to establish a transmission channel between the terminal device and the to-be-controlled device. The radio frequency circuit receives, by using the transmission channel, a response signal returned by the to-be-controlled device according to the directional signal. The processor starts, according to the response signal received by the radio frequency circuit, a target application program corresponding to the to-be-controlled device. The target application program is installed on the terminal device. Therefore, a user may not need to additionally search the terminal device for the required application program of the to-be-controlled device, but only need to send the directional signal in the direction in which the to-be-controlled device is located. The terminal device may determine the application program of the to-be-controlled device according to the response signal that is fed back, and may start the application program, so that the user is prevented from searching the terminal device for an icon of the application program, operation steps are reduced, and control operation efficiency is improved.

According to a fourth aspect, an embodiment of the present invention provides a computer storage medium, configured to store a computer software instruction used by the foregoing terminal device, where the computer storage instruction includes a program designed for the terminal device for executing the foregoing aspect.

Compared with the prior art, in the solutions provided in the present invention, the user may use the terminal device to transmit a directional signal in a direction, so that a device in the direction returns a corresponding response signal to the terminal device, and the terminal device can start a corresponding application program according to the response signal. In this way, a process in which the user uses the terminal device to control the to-be-controlled device, and searches for the application program of the to-be-controlled device is simple, and many application programs do not need to be searched one by one for the required application program. Therefore, an operation is simple.

These aspects or another aspect of the present invention is clearer and more comprehensible in descriptions of the following embodiments.

BRIEF DESCRIPTION OF DRAWINGS

FIG. 2-a is a flowchart of another embodiment of a terminal device control method according to the embodiments of the present invention;

FIG. 2-b is an effect diagram of differentially displaying icons of an embodiment of a terminal device control method according to the embodiments of the present invention;

FIG. 2-c is a structural diagram of a signal generator of an embodiment of a terminal device control method according to the embodiments of the present invention;

FIG. 2-d is a structural diagram of a signal receiver of an embodiment of a terminal device control method according to the embodiments of the present invention;

FIG. 3 is a structural diagram of an embodiment of a terminal device control apparatus according to the embodiments of the present invention.

DESCRIPTION OF EMBODIMENTS

Figure 1:
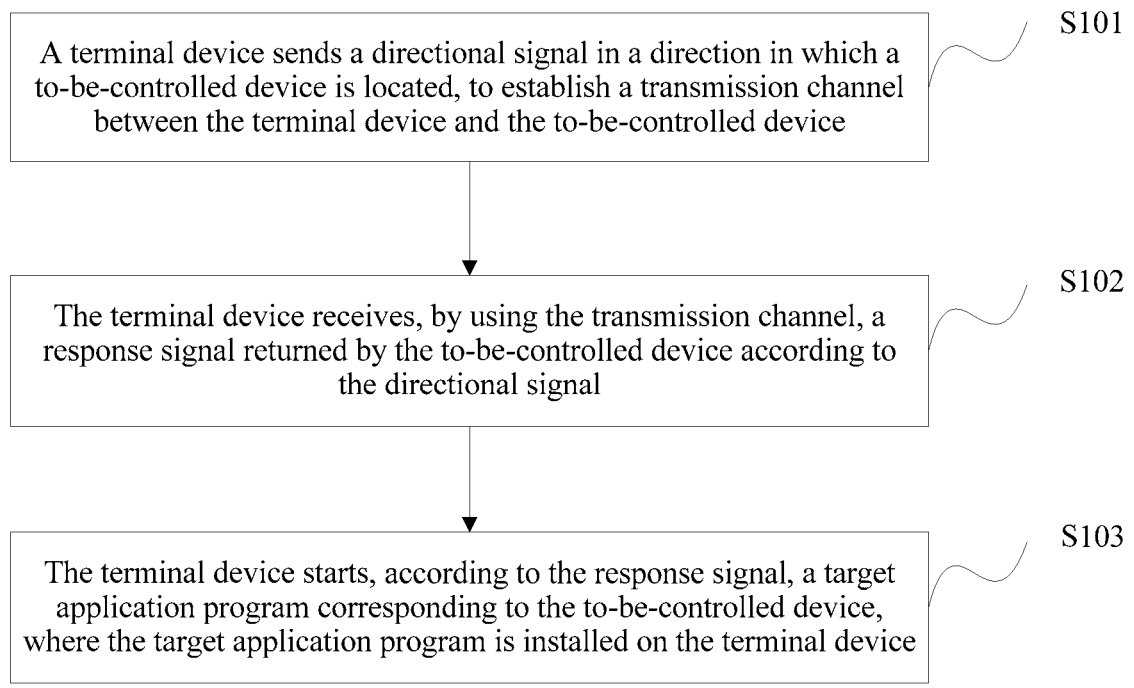
FIG. 1 is a flowchart of an embodiment of a terminal device control method according to the embodiments of the present invention.

To make persons skilled in the art understand the technical solutions in the present invention better, the following clearly and completely describes the technical solutions in the embodiments of the present invention with reference to the accompanying drawings in the embodiments of the present invention.

Some procedures described in the specification, claims, and accompanying drawings of the present invention include multiple operations that occur in a specific order. However, it should be clearly understood that these operations may not be performed according to an occurrence order of the operations in this specification or performed concurrently. Operation sequence numbers such as 101 and 102 are only intended to distinguish between different operations, and the sequence numbers do not represent any execution order. In addition, these procedures may include more or fewer operations, and these operations may be performed in order or performed concurrently. It should be noted that "first", "second", and the like described in this specification are intended to distinguish between different messages, devices, modules, and the like, do not represent an order, and may not indicate that "first" and "second" are different types.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

Solutions provided in the embodiments of the present invention may be applied to a scenario in which a terminal device controls a to-be-controlled device, or may be applied to another scenario. A specific application scenario of a terminal device control method is not limited in the embodiments of the present invention.

A directional signal is a signal that is transmitted in a limited direction instead of being diffused in space. For example, if a visible light signal or an infrared signal is obstructed by an obstruction or is reflected by using a reflector, the signal cannot be received behind the obstruction or the reflector. In the present invention, the directional signal is used to point to a to-be-controlled electronic device, so that the electronic device can be distinguished from an electronic device that is not to be controlled.

A mobile terminal is a portable and movable electronic device such as a smartphone, a personal digital assistant, a wearable device, an Internet of Things terminal, or a multi-purpose remote control (distinguished from a dedicated remote control of an electronic device) in a family. At least two software programs can be installed on the device, and different electronic devices are controlled by using these software programs.

A controlled device identifier is used to establish a correspondence between a controlled device and an application program. The controlled device identifier may include an international mobile equipment identity of a device, a device model, a device name, or the like. In conclusion, an application program matching the controlled device identifier may be correspondingly found by using the controlled device identifier.

As shown in FIG. 1, FIG. 1 is an embodiment of a terminal device control method according to the present invention. The method includes the following steps.

S101. A terminal device sends a directional signal in a direction in which a to-be-controlled device is located, to establish a transmission channel between the terminal device and the to-be-controlled device.

The terminal device may be a mobile terminal, and may be specifically a portable and movable electronic device such as a smartphone, a personal digital assistant, a wearable device, an Internet of Things terminal, or a multi-purpose remote control in a family. The terminal device includes a signal transmitter circuit that may transmit a directional signal outward. The directional signal may be a visible light signal or an infrared signal. Herein, the directional signal is transmitted, so that a device that a user expects to control can receive the directional signal. The terminal device transmits the directional signal in the direction in which the to-be-controlled device is located, so that the to-be-controlled device in the direction can receive the directional signal, and another device not in the direction cannot receive the directional signal. When receiving the directional signal, the to-be-controlled device may establish the transmission channel between the terminal device and the to-be-controlled device. The transmission channel may be a directional signal or a non-directional signal such as a Bluetooth channel or an infrared channel, provided that the transmission channel between the terminal device and the to-be-controlled device can be established. This is not specifically limited.

S102. The terminal device receives, by using the transmission channel, a response signal returned by the to-be-controlled device according to the directional signal.

After receiving the directional signal, the to-be-controlled device may feed back the response signal to the terminal device according to the directional signal. The response signal may be a non-directional signal, so that the terminal device conveniently receives the response signal. The response signal may be a Bluetooth signal. It should be noted that, before the to-be-controlled device feeds back the response signal, a security authentication phase may be set, that is, it is determined whether the received directional signal is authorized. No response may be made to an unauthorized directional signal. Certainly, the to-be-controlled device may not perform security authentication. In this case, the to-be-controlled device returns the response signal to the terminal device according to the transmission channel after receiving the directional signal. A controlled device identifier of the to-be-controlled device may be added to the response signal, so that the terminal device can determine a source of the response signal. The controlled device identifier may include an international mobile equipment identity of the device, a device model, a device name, or the like. For example, a television identifier is added to a response signal that is from a television, and an air conditioner identifier may be added to a response signal that is from an air conditioner. This is not specifically limited.

S103. The terminal device starts, according to the response signal, a target application program corresponding to the to-be-controlled device, where the target application program is installed on the terminal device.

An application program corresponding to a to-be-controlled device, such as a television app (application program) or an air conditioner app, is pre-installed on the terminal device. The terminal device may search for, according to the received response signal, and automatically start the application program of the corresponding to-be-controlled device, so as to reduce an operation time. Because the terminal device may include multiple application programs, the application program of the to-be-controlled device is determined as the target application program. Because the controlled device identifier of the to-be-controlled device may be added to the response signal, the terminal device may determine the to-be-controlled device according to the controlled device identifier. Specifically, the terminal device may preconfigure a correspondence between a controlled device identifier and an application program, and in this case, may not need to perform configuration during each time of control. The response signal carries the controlled device identifier of the to-be-controlled device. The application program is installed on the terminal device, and the application program includes the target application program. The terminal device obtains the controlled device identifier in the received response signal, and queries, in the correspondence, the target application program corresponding to the controlled device identifier. The terminal device starts the target application program. The user may control, by using the target application program, the to-be-controlled device to perform a required operation, for example, adjust volume or select a program. This is not specifically limited.

According to the terminal device control method provided in this embodiment of the present invention, the terminal device sends the directional signal in the direction in which the to-be-controlled device is located, to establish the transmission channel between the terminal device and the to-be-controlled device. The terminal device receives, by using the transmission channel, the response signal returned by the to-be-controlled device according to the directional signal. The terminal device starts, according to the response signal, the target application program corresponding to the to-be-controlled device. The target application program is installed on the terminal device. Therefore, the user may not need to additionally search the terminal device for the required application program of the to-be-controlled device, but only need to send the directional signal in the direction in which the to-be-controlled device is located. The terminal device may determine the application program of the to-be-controlled device according to the response signal that is fed back, and may start the application program, so that the user is prevented from searching the terminal device for an icon of the application program, operation steps are reduced, and control operation efficiency is improved.

As shown in FIG. 2-a, an embodiment of the present invention further provides a terminal device control method. The method includes the following steps.

S201. A terminal device sends a directional signal in a direction in which a to-be-controlled device is located, to establish a transmission channel between the terminal device and the to-be-controlled device.

Step S201 is similar to S101 in the foregoing embodiment, and details are not described herein again.

S202. The terminal device receives, by using the transmission channel, a response signal returned by the to-be-controlled device according to the directional signal.

Step S202 is similar to S102 in the foregoing embodiment, and details are not described herein again.

S203. The terminal device determines a quantity of received response signals.

When the terminal device sends the directional signal in the direction in which the controlled device is located, another device in the direction may also receive the directional signal, and may establish a transmission channel between the another device and the terminal device after receiving the directional signal. The device that receives the directional signal may feed back a response signal to the terminal device, and a controlled device identifier may be added to each response signal. For example, when a television and an air conditioner are placed quite closely, both the television and the air conditioner can receive the directional signal. A television identifier is added to a response signal that is from the television, and an air conditioner identifier may be added to a response signal that is from the air conditioner. When only one response signal is received, an application program corresponding to the response signal is started on the terminal device; or when multiple response signals, that is, two or more response signals are received, a signal in these response signals that is required by the terminal device needs to be further determined.

S204. When multiple response signals are returned, separately obtain controlled device identifiers in the response signals, and separately find corresponding multiple application programs from the correspondence.

The controlled device identifiers in the received response signals are obtained, and the corresponding application programs are found from the preconfigured correspondence, and are provided for a user for selection.

S205. Differentially display icons of the multiple application programs, so that a user selects and starts a required application program.

As shown in FIG. 2-b, an icon of a found application program and an unfound icon are differentially displayed. Differentially displaying herein is differentially displaying the icon corresponding to the found application program, so that it is easy for the user to perform distinguishing and selection. The icons of the found multiple application programs may be displayed in a highlighted manner, for example, the icons are displayed in a manner in which surfaces of the icons flash or have higher luminance; or the icons of the found multiple application programs are put into a to-be-selected area set, the to-be-selected area set is displayed on a display image in a floating manner, and the icons of the corresponding application programs are superimposed on original icons in a floating manner. As shown in FIG. 2-b, two ovals are icons displayed in a floating manner. The icons in the to-be-selected area set may be adaptively arranged in, for example, 1×2 or 2×2 dimensions for convenient display. Certainly, if a large quantity of icons are found, the user may search for an icon by means of page turning by sliding icons in the to-be-selected area; or may adjust display positions, display sizes, display contours, display colors, display luminance, or display floating of the icons of the found application program, for example, add an animation effect, so that the user can easily find the icons. Therefore, the user only needs to trigger an icon of the required application program on a screen of the terminal device, and is prevented from searching for the icon of the application program.

S206. When determining that there is one response signal, the terminal device queries, according to a controlled device identifier in the response signal, a target application program corresponding to the to-be-controlled device, and directly starts the target application program.

When one response signal is returned after the directional signal is sent in the direction in which the to-be-controlled device is located, it indicates that only one to-be-controlled device in the direction can receive the directional signal, and it may be determined that the terminal device expects to control the to-be-controlled device. In this case, an application program corresponding to the to-be-controlled device may be found directly by using a controlled device identifier in the response signal, and the application program is directly started on the terminal device. In this way, a determining phase may be saved, and operation steps are reduced, so that a control process is performed in a timelier manner, and an operation is more convenient.

The present invention provides an embodiment of a method for performing security authentication on a terminal device, and the following provides detailed descriptions.

The terminal device sends, in a direction in which a to-be-controlled device is located, a directional signal that carries an identity of the terminal device, so that identity authentication can be performed, where the identity authentication includes that the to-be-controlled device determines, according to the identity of the terminal device, whether the terminal device is authorized.

Specifically, a signal receiver may be disposed on the controlled device, and a signal generator on the terminal device may send the directional signal to the to-be-controlled device. The signal receiver is corresponding to the signal generator. For example, if the signal generator can transmit an infrared signal, the signal receiver corresponding to the signal generator can sense the infrared signal. After the infrared signal is detected by using an infrared photodiode, a resistance of the infrared photodiode changes. It is determined, according to an analysis result of the signal receiver, whether a mobile terminal is to control the controlled device. In a simple manner, if the directional signal is received, it is considered that the mobile terminal is to control the controlled device. In a complex manner, it needs to be determined, according to authentication information of the mobile terminal in the directional signal, whether the mobile terminal is authorized. If the mobile terminal is authorized, it is considered that the mobile terminal is to control the controlled device. On the premise that it is determined that the mobile terminal is to control the controlled device, a controlled device identifier is sent to the mobile terminal. A data transmission channel used in this case may be a directional signal (such as a visible light signal or an infrared signal), or may be a non-directional signal (such as a WLAN signal or a Bluetooth signal).

For structures of the signal generator and the signal receiver, the present invention provides corresponding implementations. The following provides descriptions.

As shown in FIG. 2-c, FIG. 2-c is a schematic diagram of a signal generator. A directional signal only indicates that a mobile terminal initiates a control request, but does not carry additional information. The directional signal only expresses the control request of the mobile terminal, and control information between the mobile terminal and a controlled device is transmitted by using another channel (such as a Bluetooth or WLAN channel). During implementation, a suitable obstruction is disposed around a light emitting diode, so that the directional signal can be transmitted only to a limited sector. The light emitting diode is turned on or off by using an on/off key. For example, a mobile phone generally includes a fill light of a camera, and the fill light may serve as a signal generator provided that an on/off key can be used to turn on or off the fill light in a non-photographing case.

As shown in FIG. 2-d, FIG. 2-d is an implementation example of a to-be-controlled device. A signal receiver mainly includes a photodiode, and a management module B includes a single-chip microcomputer and related software. A communications module is configured to communicate with a corresponding module of a mobile terminal and transmit control information. The communications module supports Bluetooth or a WLAN. When the photodiode detects a directional signal transmitted by a terminal device, a backward resistance of the photodiode is reduced, and therefore, a level of an input interface of the management module B changes into a high level. When detecting that the level of the input interface changes, the management module B sends a controlled device identifier of the to-be-controlled device to the terminal device by using the communications module.

The following describes the terminal device control method. As shown in FIG. 3, correspondingly, the present invention further provides a terminal device control apparatus, and the apparatus includes:

an information transceiver module 301, configured to send a directional signal in a direction in which a to-be-controlled device is located, to establish a transmission channel between the apparatus and the to-be-controlled device, where the information transceiver module 301 is further configured to receive, by using the transmission channel, a response signal returned by the to-be-controlled device according to the directional signal; and a processing module 302, configured to start, according to the response signal received by the information transceiver module 301, a target application program corresponding to the to-be-controlled device, where the target application program is installed on the terminal device.

Optionally, the apparatus further includes:

a configuration module 303, configured to configure a correspondence between a controlled device identifier and an application program, where the controlled device identifier is used to identify a to-be-controlled device, the response signal carries a controlled device identifier of the to-be-controlled device, the application program is installed on the terminal device, and the application program includes the target application program; and the processing module 302 is further configured to: query, in the correspondence of the configuration module 303, the target application program corresponding to the controlled device identifier, and start the target application program.

Optionally, the processing module 302 is further configured to determine a quantity of received response signals; and the processing module 302 is further configured to: when multiple response signals are returned, separately obtain controlled device identifiers in the response signals, separately find corresponding multiple application programs from the correspondence, and differentially display icons of the multiple application programs, so that a user selects and starts the required application program.

Optionally, the information receiving module 301 is further configured to send, in the direction in which the to-be-controlled device is located, the directional signal that carries an identity of the terminal device, so that identity authentication can be completed, where the identity authentication includes that the to-be-controlled device determines, according to the identity of the terminal device, whether the terminal device is authorized (permission of the terminal device).

Optionally, the processing module 302 is configured to: display the icons of the found multiple application programs in a highlighted manner; or put the icons of the found multiple application programs into a to-be-selected area set, and display the to-be-selected area set on a display image in a floating manner.

Optionally, the directional signal includes an infrared signal or a visible light signal.

Optionally, the transmission channel is a Bluetooth transmission channel, a WLAN channel, or an infrared transmission channel.

In the present invention, the application program corresponding to the to-be-controlled device is automatically started on the terminal device, so that operation steps are reduced, and operation efficiency is improved.

Figure 4:
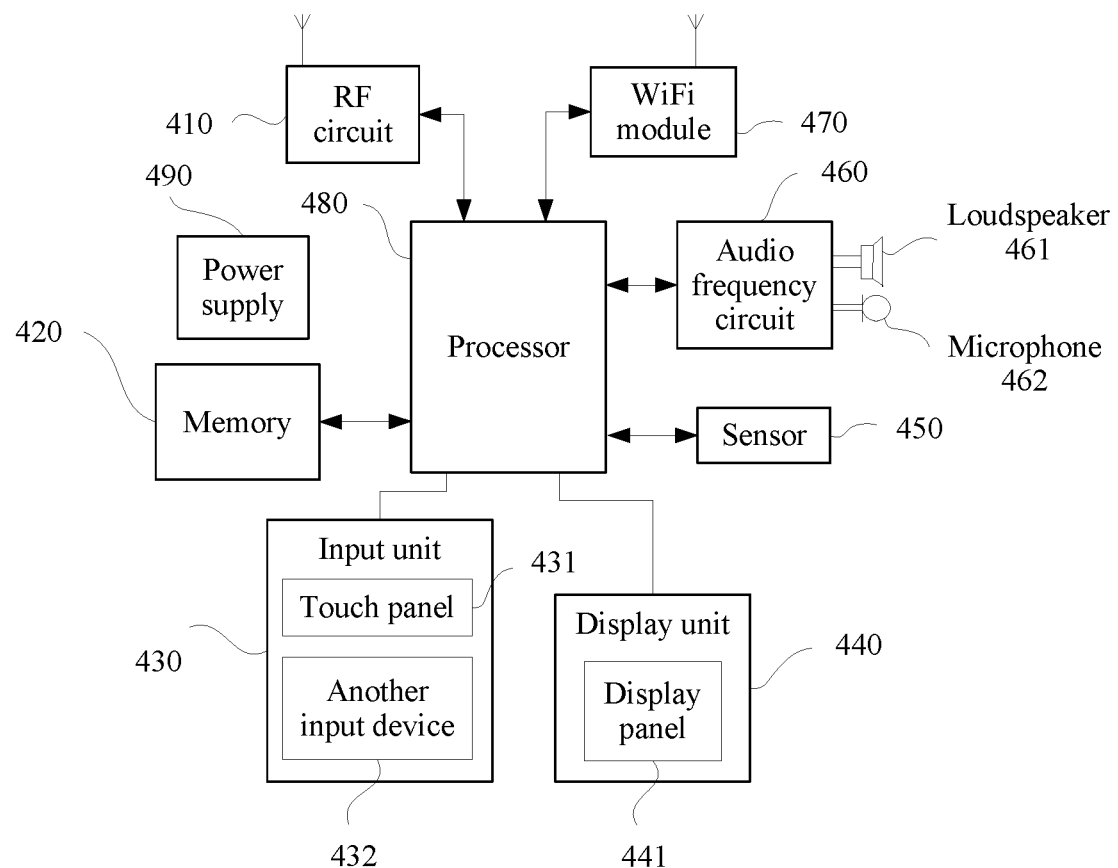
FIG. 4 is a structural diagram of an embodiment of a terminal device according to the embodiments of the present invention.

As shown in FIG. 4, an embodiment of the present invention further provides a terminal device. The following provides detailed descriptions.

For ease of description, only parts related to the embodiments of the present invention are shown. For technical details that are not disclosed, refer to the method in the embodiments of the present invention. The terminal device may be any terminal device such as a mobile phone, a tablet computer, a PDA (Personal Digital Assistant, personal digital assistant), a wearable device, an Internet of Things terminal, or a multi-purpose remote control in a family. For example, the terminal device is a mobile phone.

FIG. 4 shows a block diagram of a partial structure of a mobile phone related to a terminal provided in an embodiment of the present invention. Referring to FIG. 4, the mobile phone includes components such as a radio frequency (Radio Frequency, RF) circuit 410, a memory 420, an input unit 430, a display unit 440, a sensor 450, an audio frequency circuit 460, a Wireless Fidelity (wireless fidelity, WiFi) module 470, a processor 480, and a power supply 490. Persons skilled in the art may understand that the structure of the mobile phone shown in FIG. 4 imposes no limitation on the mobile phone, and the mobile phone may include more or fewer components than those shown in the figure, or a combination of some components, or components differently disposed.

The following provides detailed descriptions of all the components of the mobile phone with reference to FIG. 4.

The radio frequency RF circuit 410 may be configured to: receive and send information, or receive and send a signal in a call process; after receiving downlink information of a base station, send the downlink information to the processor 480 for processing; and send related uplink data to the base station. Generally, the RF circuit 410 includes but is not limited to an antenna, at least one amplifier, a transceiver, a coupler, a low noise amplifier (Low Noise Amplifier, LNA), and a duplexer. In addition, the RF circuit 410 may further communicate with a network and another device by means of wireless communication. Any communications standard or protocol may be used for the wireless communication, and includes but is not limited to the Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, or a short message service (Short Messaging Service, SMS).

The memory 420 may be configured to store a software program and a module. By running the software program and the module stored in the memory 420, the processor 480 executes various functional applications and performs data processing of the mobile phone. The memory 420 may mainly include a program storage area and a data storage area. The program storage area may store an operating system, an application program required by at least one function (such as an audio play function or an image play function), and the like. The data storage area may store data (such as audio frequency data or a phonebook) created according to use of the mobile phone, and the like. In addition, the memory 420 may include a high-speed random access memory, and may further include a non-volatile memory, such as at least one disk storage component, a flash memory component, or another volatile solid-state storage component.

The input unit 430 may be configured to receive entered digital or character information, and generate key signal input related to user setting and function control of the mobile phone. Specifically, the input unit 430 may include a touch panel 431 and another input device 432. The touch panel 431, also referred to as a touchscreen, may collect a touch operation performed by a user on or near the touch panel 431 (such as an operation performed by the user on the touch panel 431 or near the touch panel 431 by using any proper object or accessory such as a finger or a stylus), and drive a corresponding connected apparatus according to a preset program. Optionally, the touch panel 431 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, then sends the contact coordinates to the processor 480, and can receive and execute a command sent by the processor 480. In addition, the touch panel 431 may be implemented by using multiple types such as a resistive type, a capacitive type, an infrared ray, and a surface acoustic wave. In addition to the touch panel 431, the input unit 430 may include the another input device 432. Specifically, the another input device 432 may include but be not limited to one or more of a physical keyboard, a function key (such as a volume control key or an on/off key), a trackball, a mouse, or a joystick.

The display unit 440 may be configured to display information entered by the user or information provided for the user and various menus of the mobile phone. The display unit 440 may include a display panel 441. Optionally, the display panel 441 may be configured in a form of a liquid crystal display (Liquid Crystal Display, LCD), an organic light-emitting diode (Organic Light-Emitting Diode, OLED), or the like. Further, the touch panel 431 may cover the display panel 441. After detecting a touch operation on or near the touch panel 431, the touch panel 431 transmits the touch operation to the processor 480, so that a type of a touch event can be determined, and then, the processor 480 provides corresponding visual output on the display panel 441 according to the type of the touch event. In FIG. 4, the touch panel 431 and the display panel 441 are used as two independent components to implement input and input functions of the mobile phone. However, in some embodiments, the touch panel 431 and the display panel 441 may be integrated to implement the input and output functions of the mobile phone.

The mobile phone may further include at least one sensor 450, such as a light sensor, a motion sensor, or another sensor. Specifically, the light sensor may include an ambient light sensor and a proximity sensor. The ambient light sensor may adjust luminance of the display panel 441 according to brightness of ambient light, and the proximity sensor may turn off the display panel 441 and/or backlight when the mobile phone moves to an ear. As a type of motion sensor, an accelerometer sensor may detect magnitudes of acceleration in all directions (generally on three axes), and detect a value and a direction of gravity at rest, and may be applied to an application used for identifying a mobile phone posture (such as screen switching between a landscape mode and a portrait mode, a related game, or magnetometer posture calibration), a function related to vibration identification (such as a pedometer or a knock), and the like. For other sensors, such as a gyroscope, a barometer, a hygrometer, a thermometer, and an infrared sensor, that may be further configured on the mobile phone, details are not described herein.

The audio frequency circuit 460, a loudspeaker 461, and a microphone 462 may provide an audio frequency interface between the user and the mobile phone. The audio frequency circuit 460 may transmit an electrical signal converted from received audio frequency data to the loudspeaker 461, and the loudspeaker 461 converts the electrical signal into a sound signal for output. In addition, the microphone 462 converts a collected sound signal into an electrical signal, the audio frequency circuit 460 receives the electrical signal, converts the electrical signal into audio frequency data, and then outputs the audio frequency data to the processor 480 for processing. Then, the processor 480 sends the audio frequency data to, for example, another mobile phone by using the RF circuit 410, or outputs the audio frequency data to the memory 420 for further processing.

WiFi is a short-distance wireless transmission technology. The mobile phone may help, by using the WiFi module 470, the user receive and send an email, browse a web page, access streaming media, and the like. The WiFi module 470 provides wireless broadband Internet access for the user. Although the WiFi module 470 is shown in FIG. 4, it may be understood that the WiFi module 470 is not a mandatory component of the mobile phone, and may be omitted according to a requirement provided that the essence of the present invention is not changed.

The processor 480 is a control center of the mobile phone, is connected to all parts of the entire mobile phone by using various interfaces and lines, and performs various functions and data processing of the mobile phone by running or executing the software program and/or the module that are/is stored in the memory 420 and by invoking data stored in the memory 420, so as to perform overall monitoring on the mobile phone. Optionally, the processor 480 may include one or more processing units. Preferably, an application processor and a modem processor may be integrated into the processor 480. The application processor mainly processes an operating system, a user interface, an application program, and the like. The modem processor mainly processes wireless communication. It may be understood that the modem processor may not be integrated into the processor 480.

The mobile phone further includes the power supply 490 (such as a battery) that supplies power to each component. Preferably, the power supply may be logically connected to the processor 480 by using a power management system, so as to implement functions such as charging, discharging, and power consumption management by using the power management system.

The mobile phone may further include a camera, a Bluetooth module, and the like although they are not shown, and details are not described herein.

In this embodiment of the present invention, when the terminal is a mobile phone, in a first possible implementation of a terminal device control method, the following is included:

The RF circuit 410 sends a directional signal in a direction in which a to-be-controlled device is located, to establish a transmission channel between the terminal device and the to-be-controlled device;

the RF circuit 410 receives, by using the transmission channel, a response signal returned by the to-be-controlled device according to the directional signal; and the processor 480 starts, according to the response signal, a target application program corresponding to the to-be-controlled device, where the target application program is installed on the terminal device.

Based on the first possible implementation, in a second possible implementation, the processor 480 configures a correspondence between a controlled device identifier and an application program, where the controlled device identifier is used to identify a to-be-controlled device, the response signal carries a controlled device identifier of the to-be-controlled device, the application program is installed on the terminal device, and the application program includes the target application program;

the processor 480 is further configured to: obtain the controlled device identifier in the response signal, and query, in the correspondence, the target application program corresponding to the controlled device identifier; and the processor 480 is further configured to start the target application program.

Based on the second possible implementation, in a third possible implementation, the processor 480 determines a quantity of received response signals; and the processor 480 is further configured to: when multiple response signals are returned, separately obtain controlled device identifiers in the response signals, separately find, from the correspondence, multiple application programs corresponding to the controlled device identifiers, and differentially display icons of the multiple application programs, so that a user selects and starts the required application program.

Based on the first, the second, and the third possible implementations, in a fourth possible implementation, the RF circuit is further configured to send, in the direction in which the to-be-controlled device is located, the directional signal that carries an identity of the terminal device, so that identity authentication can be completed, where the identity authentication includes that the to-be-controlled device determines, according to the identity of the terminal device, whether the terminal device is authorized.

Based on the third possible implementation, in a fifth possible implementation, the processor 480 is further configured to: display the icons of the found multiple application programs in a highlighted manner; or put the icons of the found multiple application programs into a to-be-selected area set, and display the to-be-selected area set on a display image in a floating manner.

Based on the first to the fifth possible implementations, in a sixth possible implementation, the directional signal includes an infrared signal or a visible light signal.

Based on the first to the sixth possible implementations, in a seventh possible implementation, the transmission channel is a Bluetooth transmission channel, a WLAN channel, or an infrared transmission channel.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

The terminal device control method and the related device provided in the present invention have been described in detail above, and persons of ordinary skill in the art may make variations to specific implementations and the application scope according to the ideas of the embodiments of the present invention. In conclusion, the content of this specification should not be understood as a limitation on the present invention.

What is claimed is:

1. A terminal device control method, wherein the method comprises:
   sending, by a terminal device, a directional signal in a direction in which a to-be-controlled device is located, to establish a transmission channel between the terminal device and the to-be-controlled device, wherein the directional signal comprises authentication information;
   receiving, by the terminal device by using the transmission channel, a response signal returned by the to-be-controlled device according to the directional signal;
   starting, by the terminal device according to the response signal, a target application program corresponding to the to-be-controlled device, wherein the target application program is installed on the terminal device; and
   configuring, by the terminal device, a correspondence between a controlled device identifier and an application program; and, wherein:
      the controlled device identifier is configured to identify the to-be-controlled device;
      the response signal carries the controlled device identifier of the to-be-controlled device;
      the application program is installed on the terminal device; and
      the application program comprises the target application program; and, wherein
   starting, by the terminal device according to the response signal, the target application program corresponding to the to-be-controlled device comprises:
      obtaining, by the terminal device, the controlled device identifier in the response signal;
      querying, in the correspondence, the target application program corresponding to the controlled device identifier; and
      starting, by the terminal device, the target application program.

2. The method according to claim 1, wherein:
   after receiving, by the terminal device using the transmission channel, the response signal returned by the to-be-controlled device according to the directional signal, the method further comprises:
   determining, by the terminal device, a quantity of received response signals; and, wherein
   starting, according to the correspondence, the application program corresponding to the controlled device identifier specifically comprises:
      when multiple response signals are returned, separately obtaining controlled device identifiers in the response signals;
      separately finding, from the correspondence, multiple application programs corresponding to the controlled device identifiers; and
      differentially displaying icons of the multiple application programs, so that a user selects and starts the required application program.

3. The method according to claim 1, wherein sending, by the terminal device, the directional signal in the direction in which the to-be-controlled device is located comprises:
   sending, by the terminal device in the direction in which the to-be-controlled device is located, the directional signal that carries an identity of the terminal device, so that identity authentication can be completed, wherein the identity authentication comprises that the to-be-controlled device determines, according to the identity of the terminal device, whether the terminal device is authorized.

4. The method according to claim 2, wherein separately finding the corresponding multiple application programs according to the correspondence, and differentially displaying the multiple application programs comprises:
   displaying the icons of the found multiple application programs in a highlighted manner; or
   putting the icons of the found multiple application programs into a to-be-selected area set, and displaying the to-be-selected area set on a display image in a floating manner.

5. The method according to claim 1, wherein the directional signal comprises an infrared signal or a visible light signal.

6. The method according to claim 1, wherein the transmission channel is a Bluetooth transmission channel, a WLAN channel, or an infrared transmission channel.

7. A terminal device control apparatus, wherein the apparatus comprises:
   an information transceiver module, configured to:
      send a directional signal in a direction in which a to-be-controlled device is located, to establish a transmission channel between the apparatus and the to-be-controlled device, wherein the directional signal comprises authentication information; and
      receive, by using the transmission channel, a response signal returned by the to-be-controlled device according to the directional signal;
   a processing module, configured to start, according to the response signal received by the information transceiver module, a target application program corresponding to the to-be-controlled device, wherein the target application program is installed on the terminal device; and
   a configuration module, configured to configure a correspondence between a controlled device identifier and an application program; and, wherein:
      the controlled device identifier is configured to identify the to-be-controlled device;
      the response signal carries the controlled device identifier of the to-be-controlled device;
      the application program is installed on the terminal device; and, wherein
      the application program comprises the target application program; and
   the processing module is further configured to:
      query, in the correspondence of the configuration module, the target application program corresponding to the controlled device identifier; and
      start the target application program.

8. The apparatus according to claim 7, wherein:
   the processing module is further configured to determine a quantity of received response signals; and
   the processing module is further configured to:
      when multiple response signals are returned, separately obtain controlled device identifiers in the response signals;
      separately find corresponding multiple application programs from the correspondence; and
      differentially display icons of the multiple application programs, so that a user selects and starts the required application program.

9. The apparatus according to claim 7, wherein the information receiving module is further configured to send, in the direction in which the to-be-controlled device is located, the directional signal that carries an identity of the terminal device, so that identity authentication can be completed, wherein the identity authentication comprises that the to-be-controlled device determines, according to the identity of the terminal device, whether the terminal device is authorized.

10. The apparatus according to claim 8, wherein the processing module is configured to:
 display the icons of the found multiple application programs in a highlighted manner; or
 put the icons of the found multiple application programs into a to-be-selected area set, and display the to-be-selected area set on a display image in a floating manner.

11. The apparatus according to claim 7, wherein the directional signal comprises an infrared signal or a visible light signal.

12. The apparatus according to claim 7, wherein the transmission channel is a Bluetooth transmission channel, a WLAN channel, or an infrared transmission channel.

13. A terminal device, comprising a processor and a radio frequency circuit, wherein:
 the radio frequency circuit is configured to:
  send a directional signal in a direction in which a to-be-controlled device is located, to establish a transmission channel between the terminal device and the to-be-controlled device, wherein the directional signal comprises authentication information;
  receive, by using the transmission channel, a response signal returned by the to-be-controlled device according to the directional signal;
 the processor is configured to start, according to the response signal received by the radio frequency circuit, a target application program corresponding to the to-be-controlled device, wherein the target application program is installed on the terminal device;
 configure a correspondence between a controlled device identifier and an application program; and, wherein:
  the controlled device identifier is configured to identify the to-be-controlled device;
  the response signal carries a controlled device identifier of the to-be-controlled device;
  the application program is installed on the terminal device;
  the application program comprises the target application program; and, wherein starting, by the terminal device according to the response signal, the target application program corresponding to the to-be-controlled device comprises:
   obtaining the controlled device identifier in the response signal;
   querying, in the correspondence, the target application program corresponding to the controlled device identifier; and
   starting the target application program.

14. The terminal device according to claim 13, wherein the processor is further configured to:
 determine a quantity of received response signals;
 when multiple response signals are returned, separately obtain controlled device identifiers in the response signals;
 separately find, from the correspondence, multiple application programs corresponding to the controlled device identifiers; and
 differentially display icons of the multiple application programs, so that a user selects and starts the required application program.

15. The terminal device according to claim 13, wherein the radio frequency circuit is further configured to send, in the direction in which the to-be-controlled device is located, the directional signal that carries an identity of the terminal device, so that identity authentication can be completed, wherein the identity authentication comprises that the to-be-controlled device determines, according to the identity of the terminal device, whether the terminal device is authorized.

16. The terminal device according to claim 13, wherein the processor is further configured to:
 display the icons of the found multiple application programs in a highlighted manner; or
 put the icons of the found multiple application programs into a to-be-selected area set, and display the to-be-selected area set on a display image in a floating manner.

17. A computer storage medium, configured to store a computer software instruction used by a terminal device, wherein the computer software instruction comprises a program designed to execute the method according to claim 1.

* * * * *